(12) United States Patent  (10) Patent No.: US 8,473,574 B2
Kong et al.  (45) Date of Patent: Jun. 25, 2013

(54) AUTOMATIC ONLINE VIDEO DISCOVERY AND INDEXING

(75) Inventors: Xiao Kong, Beijing (CN); Shouqiu Yu, Beijing (CN); Wei Wang, Beijing (CN); Jiang-Ming Yang, Beijing (CN); Rui Cai, Beijing (CN); Haifeng Li, Beijing (CN); Xiaosong Yang, Beijing (CN)

(73) Assignee: Microsoft, Corporation, Redmond, WA (US)

( * ) Notice: Subject to any disclaimer, the term of this patent is extended or adjusted under 35 U.S.C. 154(b) by 590 days.

(21) Appl. No.: 12/783,620

(22) Filed: May 20, 2010

(65) Prior Publication Data

US 2011/0289182 A1  Nov. 24, 2011

(51) Int. Cl.
  *G06F 15/16*  (2006.01)
  *G06F 17/30*  (2006.01)
  *G06F 7/00*  (2006.01)

(52) U.S. Cl.
  USPC ............ 709/217; 707/706; 707/709; 707/711

(58) Field of Classification Search
  USPC .......................... 709/217; 707/706, 709, 711
  See application file for complete search history.

(56) References Cited

U.S. PATENT DOCUMENTS

| | | | |
|---|---|---|---|
| 6,859,799 B1 | 2/2005 | Yuen | |
| 7,246,314 B2 | 7/2007 | Foote et al. | |
| 2002/0078134 A1* | 6/2002 | Stone et al. | 709/202 |
| 2007/0028278 A1* | 2/2007 | Sigmon et al. | 725/113 |
| 2009/0150787 A1* | 6/2009 | Maehira et al. | 715/733 |
| 2009/0259633 A1 | 10/2009 | Bronstein et al. | |
| 2009/0287574 A1* | 11/2009 | Kane | 705/14.73 |
| 2009/0327100 A1 | 12/2009 | Greenberg et al. | |
| 2010/0281400 A1* | 11/2010 | Forutanpour et al. | 715/760 |

OTHER PUBLICATIONS

Sandi Pohorec, Mateja Verlic, Milan Zorman "Local search engine with global content based on domain specific knowledge", WSEAS Transactions on Information Science and Applications, Issue 9, vol. 6, Sep. 2009.*

Pohorec, et al., "Local Search Engine with Global Content based on Domain Specific Knowledge", Retrieved at <<http://www.wseas.us/e-library/transactions/information/2009/29-628.pdf>>, WSEAS Transactions on Information Science and Applications, vol. 6, No. 9, Sep. 2009, pp. 1544-1554.

(Continued)

*Primary Examiner* — Boris Gorney
(74) *Attorney, Agent, or Firm* — The Law Office of Michael E. Kondoudis

(57) ABSTRACT

A classifier may be integrated into a pipeline of a general web crawler. The classifier may classify crawled webpages as either video pages or non-video pages. Video pages and information regarding domain importance may be aggregated. Ones of the domains of the video pages may be selected based on domain importance rankings. Webpages of the selected domains may be randomly sampled. The sampled webpages may be structurally analyzed and hint information may be generated with respect to each of the selected domains. The hint information may guide a deep crawling operation for discovering all video pages within the selected domains. Video links within the video pages may be found, one or more videos may be downloaded, and one or more representations of the one or more videos may be indexed.

20 Claims, 7 Drawing Sheets

OTHER PUBLICATIONS

Baluja, et al., "Video Suggestion and Discovery for YouTube: Taking Random Walks Through the View Graph", Retrieved at <<http://www.esprockets.com/papers/adsorption-yt.pdf>>, International World Wide Web Conference, Proceeding of the 17th international conference on World Wide Web, Apr. 21-25, 2008, p. 10.

Petrelli, et al., "An Examination of Automatic Video Retrieval Technology on Access to the Contents of an Historical Video Archive", Retrieved at <<http://eprints.whiterose.ac.uk13772/1/Program08.pdf>>, Program: Electronic library and information systems, May 2008, p. 16.

* cited by examiner

AUTOMATIC ONLINE VIDEO DISCOVERY AND INDEXING

BACKGROUND

One existing method for discovering and indexing video in a networked environment, such as, for example, the Internet, another network, or a combination of networks, is a manual-based approach. Using the manual-based approach, a small number of top video sites is targeted. By manually exploring each of the small number of top video sites, one can learn uniform resource locator (URL) patterns of video play pages of respective ones of the small number of top video sites. Within the small number of top video sites the learned URL patterns of the video play pages may be used, such that any URL, within the small number of top video sites, that matches a learned a URL pattern for a video play page of a respective one of the small number of top video sites is considered to be a video page. Websites, or domains, corresponding to each of the small number of top video sites, may be manually explored to learn corresponding LinkPage patterns of links to downloadable video. Deep crawling of the small number of top video sites may then be performed by following a corresponding one of the LinkPage patterns for each of the small number of top video sites. A debugging tool may then be used to monitor browser/server communications in order to reverse engineer a process for generating a video link. A video may then be downloaded and indexed.

The above-mentioned method for discovering and indexing video works well for a small selected number of sites. However, the above-mentioned method is not scalable to a large number of sites, such as, for example, 100,000 or more sites. For example, when a change in a target site has been made, learning new URL patterns of video play pages, learning new LinkPage patterns of links to downloadable video, and reverse engineering a new process for generating a video link makes maintenance burdensome.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a classifier may be provided for classifying a webpage as either a video page or a non-video page. The classifier may be integrated into a pipeline of a general web crawler. Webpages classified as video pages by the classifier may be aggregated and information regarding importance of domains of the classified video pages may be collected. A number of domains of interest may then be selected. Random sampling of webpages included in the selected domains may be performed. With respect to each of the selected domains, webpages may be grouped into a number of page groups based, at least in part, on layouts and visual patterns of the webpages. A link structural sitemap of each of the selected domains may be analyzed and hint information may be generated for guiding a deep crawling operation in order to discover all video pages within each of the selected domains. The hint information may include URL patterns that may indicate whether a URL refers to a target page, a useful link page, or a useless page. One or more video links may be discovered in the webpages and one or more videos may be downloaded based on the discovered one or more video links. A representation of each of the one or more videos may then be indexed.

In some embodiments, the representation of each of the one or more videos may include one or more smart motion thumbnails, which may be generated based on the one or more downloaded videos. A smart motion thumbnail, may be a motion summarization of a video. The smart motion thumbnail may provide a video preview of a video when a pointing device hovers over the smart motion thumbnail. The pointing device may be a computer mouse, a trackball device, an electronic pen, a stylus or a finger over a touch screen, or another type of pointing device. Each of the one or more smart motion thumbnails may be of a predetermined length.

In various embodiments, discovered video pages may be provided to a service. The service may find one or more video links within the video pages, may extract the one or more video links, and may include the one or more video links in results of the service. The service may be implemented in a dynamic rendering environment, which may further be implemented on a virtual machine. In some embodiments, the virtual machine may be reloaded every predetermined time period in order to reduce a security risk regarding the service rendering a URL via a browser.

DRAWINGS

In order to describe the manner in which the above-recited and other advantages and features can be obtained, a more particular description is discussed below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a classifier for classifying a webpage as either a video page or a non-video page is disclosed. The classifier may be integrated into a pipeline of a general web crawler. Webpages classified as video pages may be aggregated and information regarding an importance of domains that include the classified webpage may be collected. Domain importance rankings of domains corresponding to the aggregated webpages may be determined based on the collected information. A number of domains of interest may be selected and random sampling of webpages included in the selected domains may be performed. With respect to each of the selected domains, page groups may be formed by assigning webpages having similar layouts and visual patterns to same ones of the page groups. Hint information for each of the selected domains may be generated based on attributes and relationships among each of the corresponding page groups. The hint information may be used to guide a deep crawling operation of the selected domains in order to discover all video pages within the selected domains. The discovered video pages may then be indexed.

In one embodiment, discovered video pages may be sent, or provided, to a service executing in a dynamic rendering environment. The dynamic rendering environment may execute on a virtual machine. The service may include a browser, such as, for example, Internet Explorer® (Internet Explorer is a registered trademark of Microsoft Corporation of Redmond, Wash.) or a different browser, and a video link finder. The video link finder may monitor communications between the browser and a server, which may be a source of video, to learn a process for generating video links within the selected domains. The service may then return results including one or more video links. Each of the one or more video links may then be used to download a respective video. The respective video may be used to generate a representation of the respective video, which may then be indexed. In some embodiments, the representation may include a smart motion thumbnail of a predetermined length.

Exemplary Operating Environment

Figure 1:
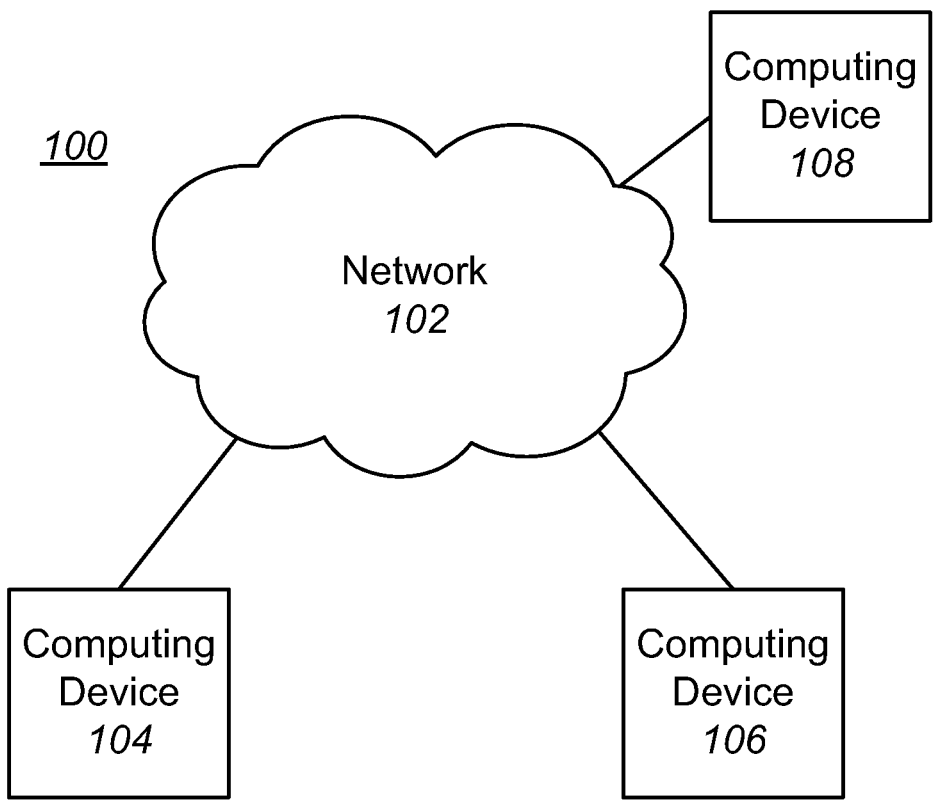
FIG. 1 illustrates an exemplary operating environment for embodiments consistent with the subject matter of this disclosure.

FIG. 1 illustrates an exemplary operating environment 100 in which embodiments consistent with the subject matter of this disclosure may be implemented. Exemplary operating environment 100 may include a network 102 and computing devices 104, 106, 108.

Network 102 may be a single network or a combination of multiple networks including, but not limited to, the Internet. Network 102 may include a wired network, a wireless network, a packet-switching network, a frame-relay network, a combination of networks, and/or other types of networks.

Computing device 104, 106, 108 may be electronic computing devices connected to network 102. Computing device 104 may execute a browser application and may communicate with other computing devices, such as computing devices 106, 108 via network 102. Computing devices 106, 108 may be connected to network 102 and may be capable of communicating with computing device 104, as well as other computing devices, via network 102.

Operating environment 100 is only exemplary. Other operating environments may include more or fewer computing devices 104, 106, 108.

Exemplary Computing Device

Figure 2:
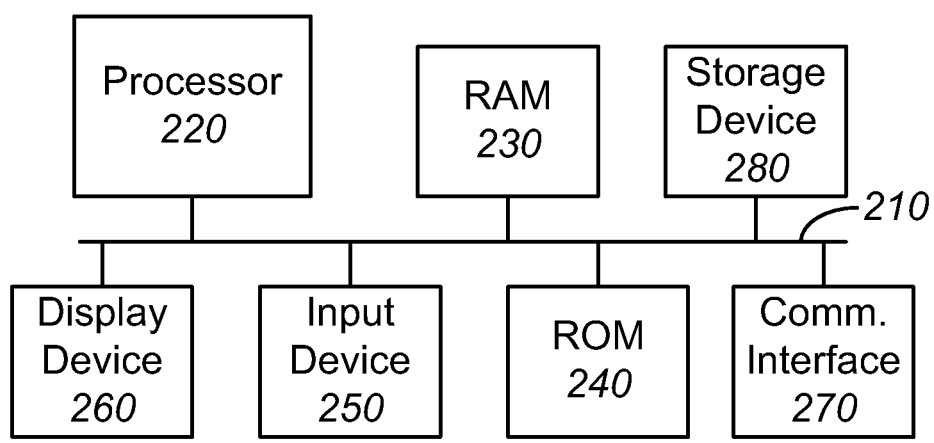
FIG. 2 is a block diagram of an exemplary processing device, which may be used to implement embodiments consistent with subject matter of this disclosure.

FIG. 2 is a diagram of an exemplary computing device 200, which may be used to implement computing devices 104, 106, 108 in embodiments consistent with the subject matter of this disclosure. Computing device 200 may be a personal computer (PC), a portable computing device, or another type of computing device. Computing device 200 may include a bus 210, a processor 220, a random access memory (RAM) 230, a read only memory (ROM) 240, an input device 250, a display device 260, a communication interface 270, and a storage device 280. Bus 210 may connect processor 220, RAM 230, ROM 240, input device 250, display device 260, communication interface 270, and storage device 280.

Processor 220 may include one or more conventional processors that interpret and execute instructions. A memory may include RAM 230, ROM 240, and/or another type of dynamic or static storage device that stores information and instructions for execution by processor 220. RAM 230, or another type of dynamic storage device, may store instructions as well as temporary variables or other intermediate information used during execution of instructions by processor 220. ROM 240, or another type of static storage device, may store static information and instructions for processor 220.

Input device 250 may include a keyboard, a pointing device, an electronic pen, a touchscreen, or other device for providing input. Display device 260 may include a display monitor with a display screen, upon which information may be displayed.

Communication interface 270 may transmit information to and receive information from other computing devices via a network. Communication interface 270 may communicate via the network either wirelessly or via a wired connection.

Storage device 280 may include one or more non-transient media for storing information. Processor 220 may read information from the one or more non-transient media and/or may write information to the one or more non-transient media. The one or more non-transient media may include one or more magnetic disks, optical disks, flash RAM, or other type of non-transient medium.

In some embodiments, at least one of computing devices 104, 106, 108 may be a server that provides a search service. In such a case, the server may be implemented using multiple computing devices 200 working together as a server farm. At least some computing devices 200 within the server farm may not include display device 260 and/or input device 250.

Computing device 200 may perform functions in response to processor 220 executing sequences of instructions contained in one or more non-transient machine-readable media, such as, for example, RAM 230, ROM 240, storage device 280 or other non-transient media. Such instructions may be read into RAM 230 from another non-transient machine-readable medium or from a separate device via communication interface 270.

Embodiments

Figure 3:
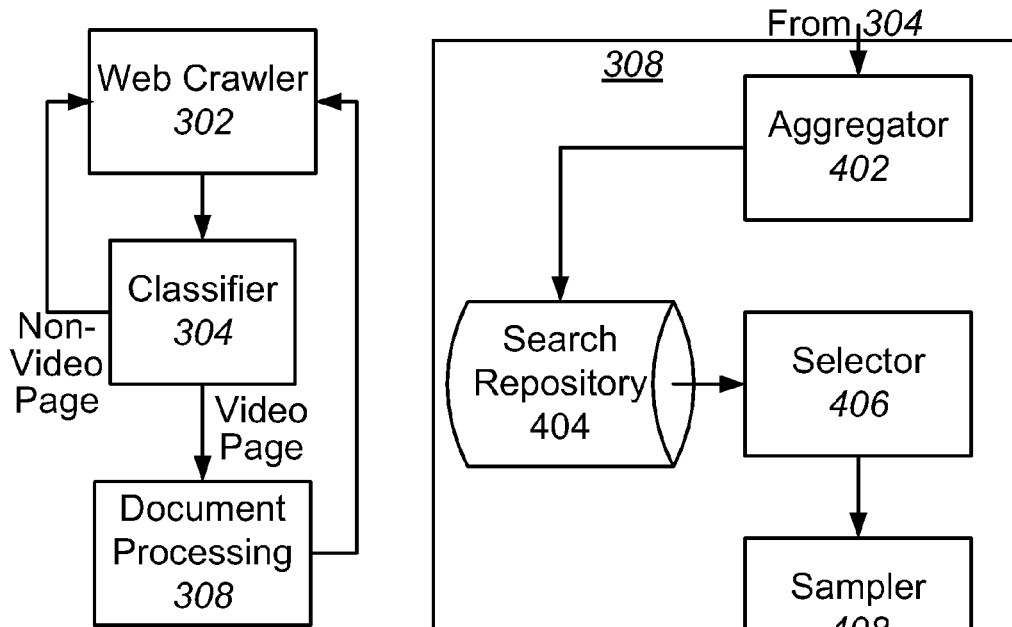
FIGS. 3 and 4 are functional block diagrams of a computing device which may implement embodiments consistent with the subject matter of this disclosure.
Figure 4:
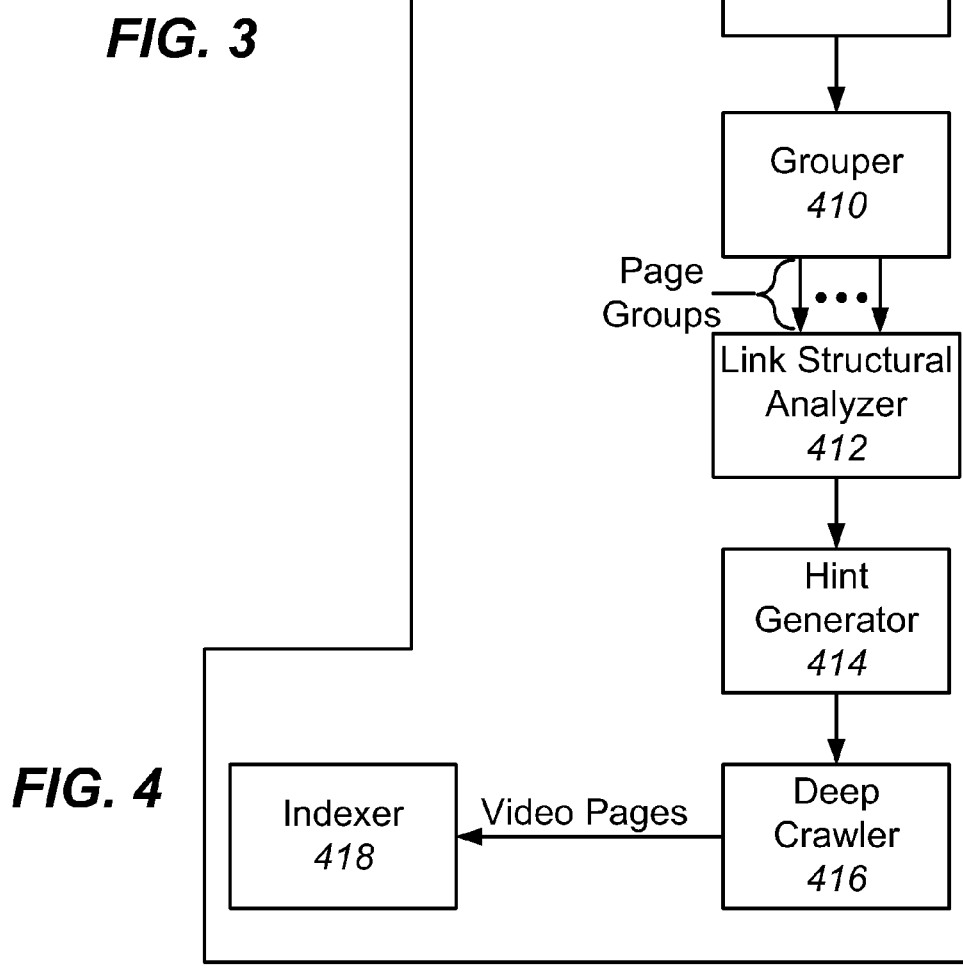

FIGS. 3 and 4 illustrate a functional block diagram of a computing device, such as, for example, computing device 104, in embodiments consistent with the subject matter of this disclosure. The computing device may include a web crawler 302, a classifier 304, and a document processing component 308. Document processing component 308 may include an aggregator 402, a search repository 404, a selector 406, a sampler 408, a grouper 410, a link structural analyzer 412, a hint generator 414, a deep crawler 416, and an indexer 418. In some embodiments, any or all of web crawler 302, classifier 304, aggregator 402, search repository 404 selector 406, sampler 408, grouper 410, link structural analyzer 412, hint generator 414, deep crawler 416, and indexer 418 may be implemented in software or firmware. In other embodiments, any or all of web crawler 302, classifier 304, aggregator 402, search repository 404 selector 406, sampler 408, grouper 410, link structural analyzer 412, hint generator 414, deep crawler 416, and indexer 418 may be implemented via hardware, such as, for example, an application specific integrated circuit (ASIC) or other hardware. In another set of embodiments, any or all of web crawler 302, classifier 304, aggregator 402, search repository 404 selector 406, sampler 408, grouper 410, link structural analyzer 412, hint generator 414, deep crawler 416, and indexer 418 may be implemented via software, firmware, or a combination of software or firmware and hardware.

Web crawler 302 may be a general web crawler that crawls webpages in an order according to a static rank (a query-independent rank). Classifier 304 may be integrated in a web crawler pipeline and may classify each webpage found by web crawler 302 as either a video page or a non-video page.

Figure 5:
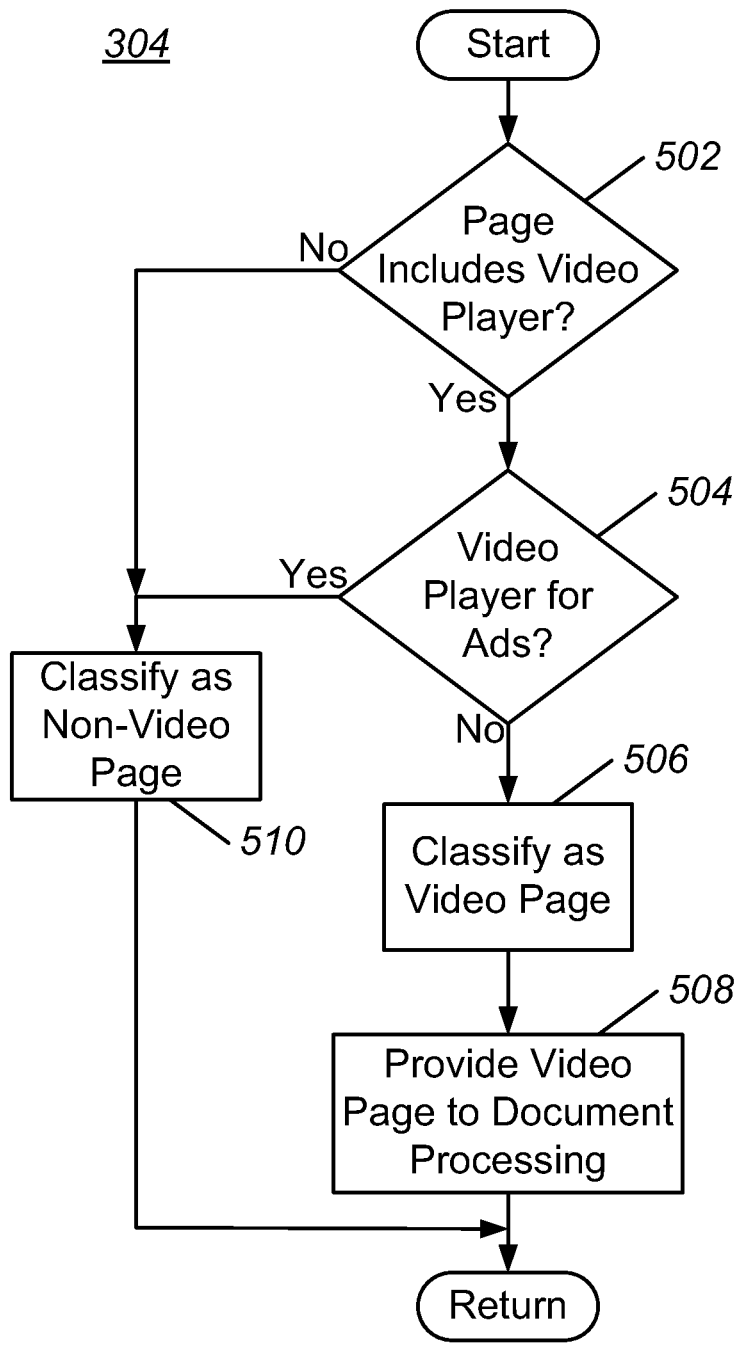
FIGS. 5-10 are flowcharts that illustrate exemplary processing that may be performed in embodiments consistent with the subject matter of this disclosure.

FIG. 5 is a flowchart that illustrates exemplary processing in an embodiment of classifier 304. The process may begin with classifier 304 determining whether a webpage includes information for a video player (act 502). If the webpage does not include information for a video player, then the webpage may be classified as a non-video page (act 510) and the process may be completed. If the webpage does include information for a video player, then classifier 304 may determine whether the video player is for playing an advertisement (act 504). Classifier 304 may determine whether the video player is for playing an advertisement by examining a footprint of the video player information. That is, classifier 304 may examine features or attributes of the video player based on the video player information. For example, a video player for playing advertisements may permit some actions which a video player that does not play advertisements may not permit.

If the information for a video player is determined to be for a video player for playing an advertisement, then classifier 304 may classify the webpage as a non-video page (act 510) and the process may be completed. Otherwise, classifier 304 may classify the webpage as a video page (act 506) and the video page may be provided to document processing component 308 (act 508). The process may then be completed.

Figure 6:
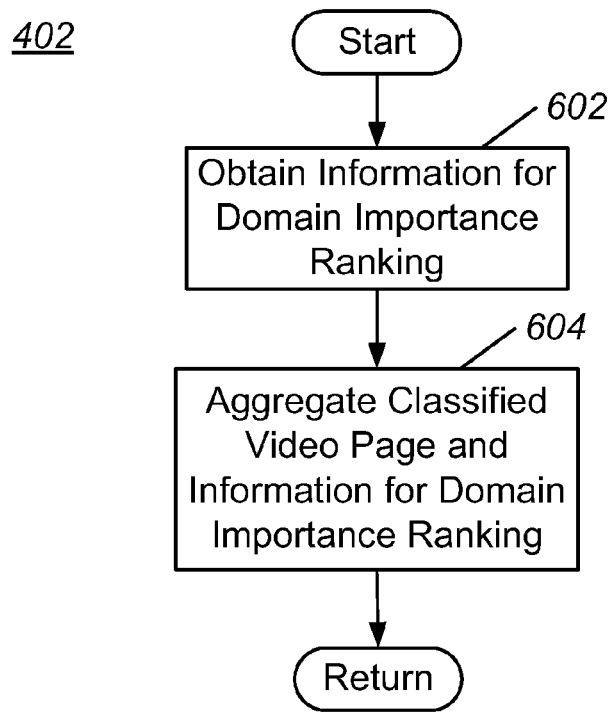

FIG. 6 is a flowchart illustrating exemplary processing of aggregator 402 (FIG. 4) of document processing component 308 (FIG. 3). The process may begin with aggregator 402 obtaining information related to domain importance ranking (act 602). For example, aggregator 402 may use one or more public application program interfaces (APIs) to obtain information including, but not limited to, a number of search engine hits with respect to webpages included in a corresponding domain. Further, aggregator 402 may obtain other information including, but not limited to, a number of video pages included in the corresponding domain. At least some of the obtained information may be collected from one or more search tool bars, which may have a set of public APIs. Aggregator 402 may aggregate the classified video pages and may collect the obtained information related to domain importance ranking in search repository 404 (act 604).

Figure 7:
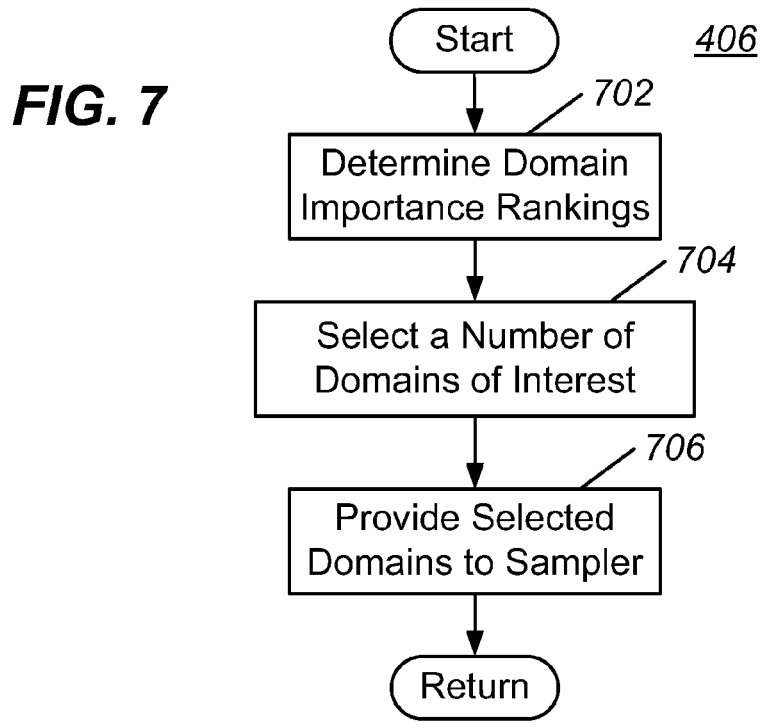

Returning to FIG. 4, selector 406 may a select a number of domains of interest based on the aggregated classified video pages and the collected information related to domain importance ranking from search repository 404. FIG. 7 is a flowchart illustrating exemplary processing of selector 406 in an embodiment consistent with the subject matter of this disclosure. The process may begin with selector 406 determining domain importance rankings of domains based on the collected obtained information in search repository 404 related to domain importance ranking (act 702). Selector 406 may then select a number of domains of interest based on domain importance rankings (act 704), as determined during act 702. In some embodiments, selector 406 may select a predetermined number of the most important domains. Information regarding the selected domains may then be provided to sampler 408 (act 706) (See sampler 408 in FIG. 4).

Sampler 408 may randomly sample webpages within each of the selected domains. The random sampling of the webpages may mimic manual exploration of each of the selected domains. Information regarding each of the randomly sampled webpages of a respective selected domain may be collected. The information may include information regarding, for example, a layout of a webpage, a visual pattern of a webpage, and/or other information.

Figure 8:
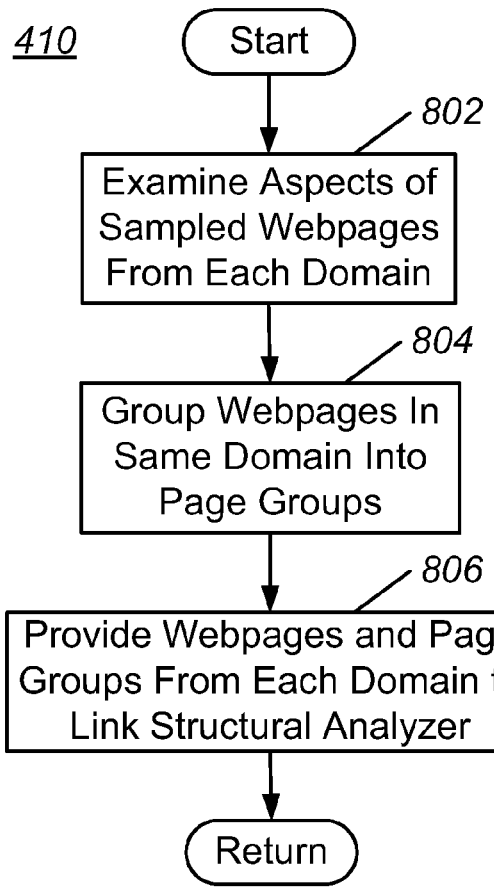

Grouper 410 may group the randomly sampled webpages of a respective selected domain into a number of page groups. FIG. 8 illustrates a flowchart of exemplary processing performed by an exemplary embodiment of grouper 410 in an embodiment consistent with the subject matter of this disclosure. The process, with respect to each of the selected domains, may begin with grouper 410 examining aspects of the randomly sampled webpages of a respective selected domain (act 802). For example, in some embodiments, grouper 410 may examine a layout and a visual pattern of the randomly sampled webpages, based on the collected information. Grouper 410 may then form page groups, or assign the randomly sampled webpages to page groups, within the respective selected domain (act 804). For example, ones of the randomly sampled webpages of the respective selected domain that have similar layouts and visual patterns may be grouped, or assigned, to a same page group. The randomly sampled webpages of the respective selected domain and corresponding page groups may then be provided to link structural analyzer 412 (act 806) (see FIG. 4).

Figure 9:
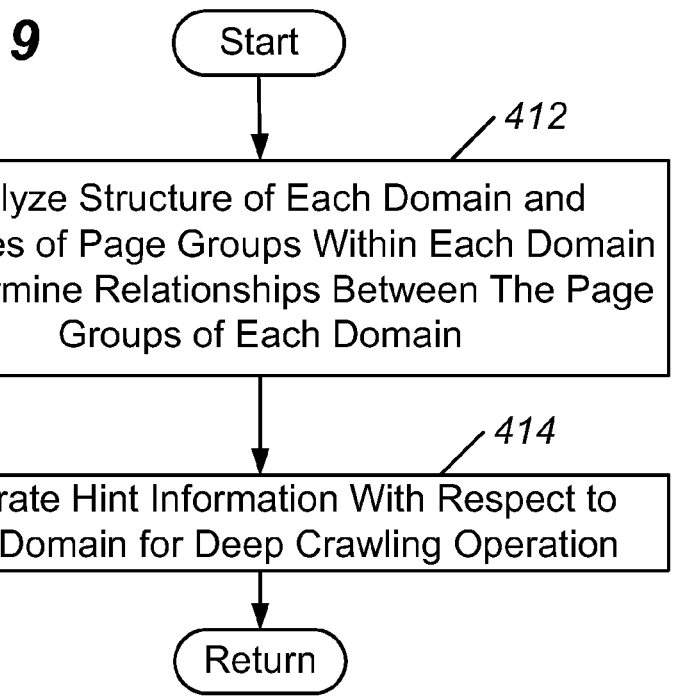

FIG. 9 is a flowchart illustrating exemplary processing with respect to link structural analyzer 412 and hint generator 414 in embodiments consistent with the subject matter of this disclosure. The process may begin with link structural analyzer 412 analyzing attributes of page groups within each respective one of the selected domains and a structure of each of the respective ones of the selected domains to determine relationships among the page groups of each of the respective ones of the selected domains. As an example, link structural analyzer 412 may determine that webpages of a first page group of a respective one of the selective domains may be linked to webpages of a second page group of the respective one of the selective domains, but webpages of the second page group may not be linked to webpages of the first page group. Similarly, link structural analyzer 412 may determine that webpages of a first particular page group of the respective one of the selective domains have a first URL pattern and webpages of a second particular page group have a second URL pattern. Further, video page classifier 304 may determine that webpages of one page group may be video pages, webpages of another page group may be index pages, and webpages of a third group may be useless pages. Hint generator 414 may then generate hint information for each of the respective ones of the selected domains. The hint information may be used to guide a deep crawling operation with respect to each of the respective ones of the selected domains.

Returning to FIG. 4, deep crawler 416 may deep crawl each of the respective ones of the selected domains using the generated hint information as a guide in order to discover all video pages of the respective ones of the selected domains.

Figure 10:
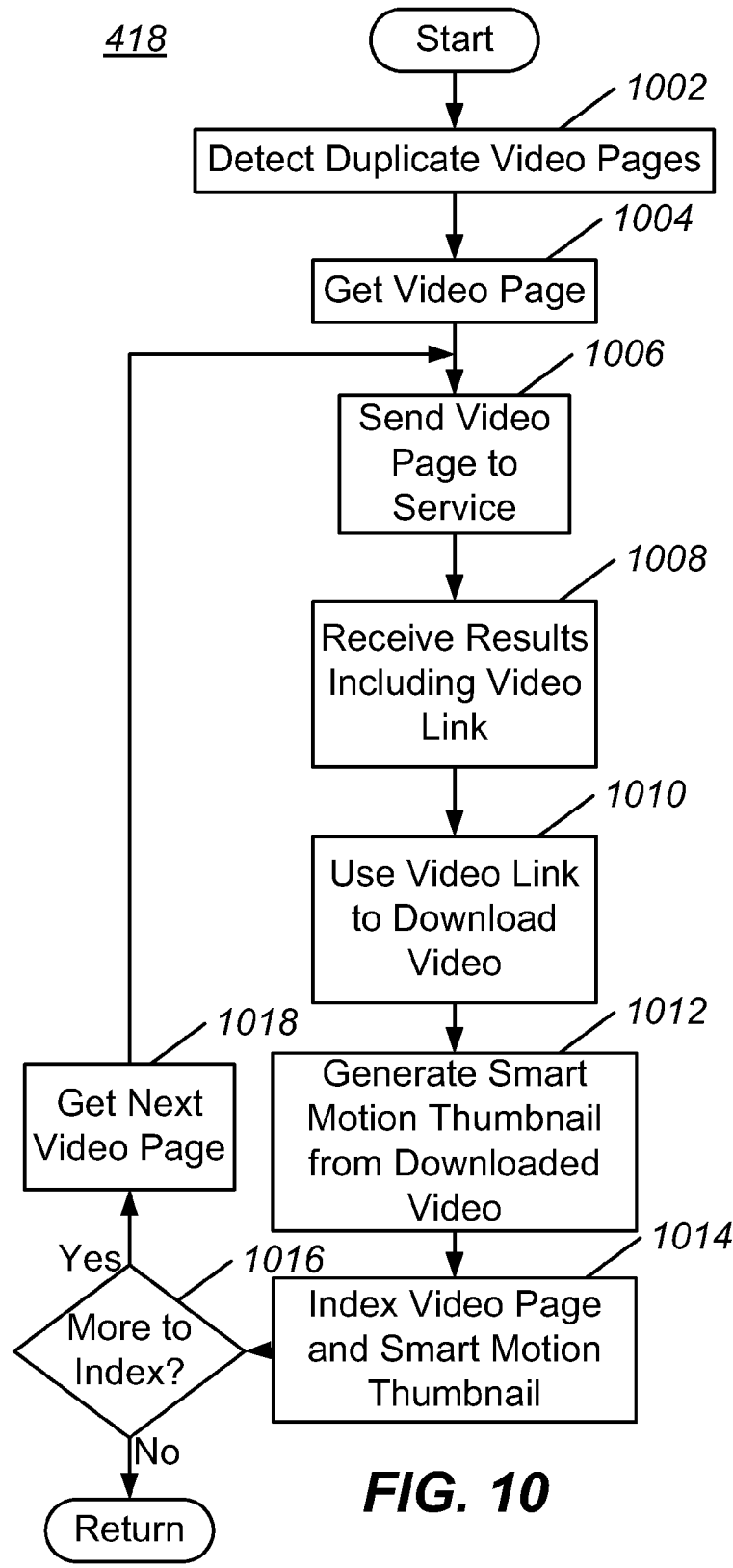

Indexer 418 may be provided with video pages from deep crawler 416 and may index the video pages. FIG. 10 is a flowchart illustrating exemplary processing that may be performed by indexer 418 in embodiments consistent with the subject matter of this disclosure. The process may begin with indexer 418 detecting duplicate video pages (act 1002) in order to prevent indexing of the duplicate video pages. Duplicate video pages may be detected using any one of a number of methods including a normalization method and other methods, some of which are well-known.

Indexer 418 then may obtain a video page provided by deep crawler 416 (act 1004). Indexer 418 may then send, or provide, the video page to a service (act 1006). The service may be executing within a same computing device as indexer 418 or a different computing device. Indexer 418 may receive results, which may include one or more video links, from the service (act 1008). Indexer 418 may then use the one or more video links to download one or more videos (act 1010). In some embodiments indexer 418 may then generate one or more smart motion thumbnails from the one or more downloaded videos (act 1012). Indexer 418 may then index the video page and the one or more smart motion thumbnails (act 1014).

Indexer 418 may then determine whether other video pages have been provided by deep crawler 416 (act 1016). If no other video pages have been provided by deep crawler 416, then processing is complete. Otherwise, indexer 418 then may obtain a next video page provided by deep crawler 416 (act 1018). Acts 1006-1016 may then be repeated.

Figure 11:
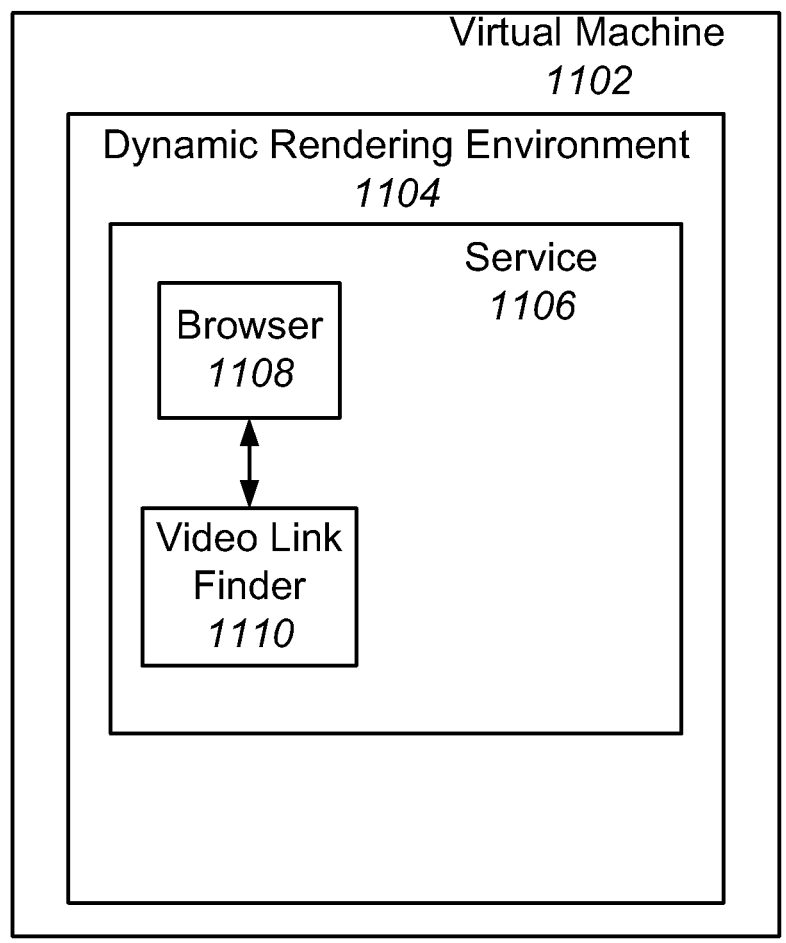
FIG. 11 illustrates an exemplary environment for executing a service in embodiments consistent with the subject matter of this disclosure.

FIG. 11 illustrates an exemplary environment 1100 in which the service may be implemented. Environment 1100 may include a virtual machine 1102, a dynamic rendering environment 1104, a service 1106, a browser 1108, and a video link finder 1110.

Service 1106 may include browser 1108 and video link finder 1110. Browser 1108 may be an Internet Explorer® browser, available from Microsoft Corporation of Redmond, Wash., or another browser. Browser 1108 may render a provided video page. Video link finder 1110 may monitor communications between browser 1108 and a server providing the video page in order to obtain one or more video links from the video page and download one or more raw videos. Video link finder 1110 may examine a file extension included in a request from browser 1108 and a type of file included in a response to the request to determine whether the response includes downloaded video. Service 1106 may provide the one or more video links to indexer 418 when the response is determined to include the downloaded video.

Service 1106 may be implemented within dynamic rendering environment 1104. Dynamic rendering environment 1104 may be implemented on virtual machine 1102, which may execute on a same computing device as indexer 418 or a different computing device. In some embodiments, virtual machine 1102 may be reloaded every predetermined period of time. The predetermined period of time may be three hours or another period of time. By implementing service 1106 on virtual machine 1102, possible security issues may be isolated to virtual machine 1102.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIG. 5-10 may be different and/or may include additional or other acts.

Accordingly, the appended claims and their legal equivalents define embodiments, rather than any specific examples given.

We claim as our invention:

1. A method for discovering and indexing online video content, the method comprising:
    classifying each of a plurality of webpages as either a video page or a non-video page;
    aggregating ones of the plurality of webpages classified as a video page;
    determining a respective domain importance ranking for each of a plurality of domains of the ones of the plurality of webpages classified as a video page;
    selecting ones of the plurality of domains based on the respective domain importance rankings;
    randomly sampling webpages of the selected ones of the plurality of domains;
    automatically, for each of the selected ones of the plurality of domains, forming page groups, based, at least in part, on layouts and visual patterns of the randomly sampled webpages;
    generating hint information for each of the selected ones of the plurality of domains based, at least in part, on attributes of corresponding page groups for guiding a deep crawling operation of the selected ones of the plurality of domains;
    using the hint information to guide the deep crawling operation of the selected ones of the plurality of domains to discover video pages in each of the selected ones of the plurality of domains; and
    indexing the discovered video pages, wherein the method is implemented on an electronic computing device.

2. The method of claim 1, wherein the indexing the discovered video pages further comprises:
    sending the discovered video pages to a service executing within a dynamic rendering environment,
    receiving resents from the service,
    downloading video based on the received results, and
    adding a representation of the video to a video search index.

3. The method of claim 2, wherein:
    the dynamic rendering environment includes a browser executing in a virtual machine, and
    the dynamic rendering environment is implemented on either the electronic computing device or a second electronic computing device having a communication connection with the electronic computing device.

4. The method of claim 3, further comprising:
    using, by the service, the browser included in the dynamic rendering environment to discover at least one video link within the discovered video pages; and
    providing, by the service to the electronic computing device, the results including the at least one discovered video link.

5. The method of claim 1, further comprising:
    crawling the plurality of webpages with a general web crawler, wherein the classifying is performed on each of the crawled plurality of webpages.

6. The method of claim 1, wherein the classifying each of a plurality of webpages further comprises:
    determining whether a respective webpage of the plurality of webpages includes video player information,
    determining whether the video player information included in the respective webpage is to be used for playing an advertisement, and
    classifying the respective webpage as a video page when the respective webpage is determined to include the video player information and the video player information is not to be used for playing an advertisement.

7. The method of claim 1, wherein the determining a respective domain importance ranking for each of a plurality of domains of the ones of the plurality of webpages classified as a video page further comprises:
determining the respective domain importance ranking for each of the selected ones of the plurality of domains based on at least one item from a group including a number of video pages discovered in a respective domain of the plurality of domains, a number of download requests made for video pages included in the respective domain, and information obtained through public application program interfaces.

8. An electronic computing device for discovering and indexing online video content, the electronic computing device comprising at least one processor programmed to implement instructions to:
crawl a plurality of webpages;
classify each of the plurality of webpages as either a video page or a non-video page;
aggregate ones of the plurality of webpages classified as a video page by the classifier;
select ones of a plurality of domains based on respective domain importance rankings, each of the plurality of domains including at least one of the plurality of webpages classified as a video page;
sample webpages of each of the selected ones of the plurality of domains;
assign each of the sampled webpages to a respective one of a plurality of page groups of a respective one of the selected ones of the plurality of domains based on a layout and a visual pattern of each of the sampled webpages;
analyze a structure of each of the selected ones of the plurality of domains to determine relationships among the plurality of page groups of each of the selected ones of the plurality of domains;
generate hint information for guiding a deep crawling operation with respect to each of the selected ones of the plurality of domains based on attributes and relationships among the sampled webpages of each of the selected ones of the plurality of domains; and
index video pages discovered during the deep crawling operation.

9. The electronic computing device of claim 8, wherein the instructions to index include instructions to:
provide the video pages discovered during the deep crawling operation to a service executing in a virtual machine, and
receive results from the service, the results including at least one video link for downloading a video.

10. The electronic computing device of claim 9, wherein the instructions to index include instructions to:
generate a predetermined amount of a smart motion thumbnail based on using one of the at least one video link to download the video; and
index the generated predetermined amount of the smart motion thumbnail.

11. The electronic computing device of claim 9, wherein the service is implemented in a dynamic rendering environment comprising a browser executing on the virtual machine.

12. The electronic computing device of claim 8, wherein the instructions to crawl include instructions to crawl the plurality of webpages in an order based on a respective static rank of each of the plurality of webpages.

13. The electronic computing device of claim 8, wherein the instructions to classify include instructions to classify a webpage as a video page when the webpage includes video player information and a footprint of the video player information included in the webpage indicates that the video player information is for playing video content other than an advertisement.

14. The electronic computing device of claim 8, wherein the instructions to index include instructions to detect duplicate video pages in order to prevent indexing of the duplicate video pages.

15. At least one machine-readable storage device having information recorded thereon for at least one processor of an electronic computing device, the information comprising:
instructions for web crawling a plurality of webpages;
instructions for classifying each of the plurality of webpages as either a video page or a non-video page, each of the plurality of webpages being included in a corresponding domain;
instructions for aggregating each of the plurality of webpages classified as a video page and corresponding domain importance ranking information;
instructions for selecting a plurality of domains based on the aggregated corresponding domain importance ranking information;
instructions for randomly sampling webpages of each of the selected plurality of domains to obtain structural information;
instructions for grouping, for each of the selected plurality of domains, ones of the randomly sampled webpages of a corresponding domain into a plurality of page groups based on similarities among the ones of the randomly sampled webpages;
instructions for analyzing the obtained structural information of the randomly sampled webpages of each of the selected plurality of domains;
instructions for generating hint information for each of the selected plurality of domains based on the obtained structural information and corresponding ones of the plurality of page groups;
instructions for using the generated hint information to perform a deep crawling operation of each of the selected plurality of domains to discover all video pages in each of the selected plurality of domains; and
instructions for indexing representations of all of the discovered video pages in each of the selected plurality of domains.

16. The at least one device of claim 15, further comprising:
instructions for providing the discovered video pages of each of the selected plurality of domains to a service executing on a virtual machine;
instructions for receiving results from the service, the results including at least one video link obtained from the discovered video pages of ones of the selected plurality of domains;
instructions for using the at least one video link to download a video;
instructions for generating a smart motion thumbnail of a predetermined length based on the downloaded video; and
instructions for indexing the generated smart motion thumbnail.

17. The at least one device of claim 16, further comprising:
instructions for implementing the service on a virtual machine.

18. The at least one device of claim 17, wherein the virtual machine is reloaded after every predetermined period of time.

19. The at least one device of claim 17, further comprising:
  instructions for the service to use a browser, executing on the virtual machine, to make a request based on a video link of the at least one video link;
  instructions for the service to examine a file extension included in the request and a type of a file included in a response to the request to determine whether the response includes the downloaded video; and
  instructions for including, in the results of the service, the video link when the response is determined to include the downloaded video.

20. The at least one device of claim 19, wherein the browser includes an Internet Explorer® browser.

* * * * *